G. F. PLANK.
MOTOR CYCLE PASSENGER SEAT.
APPLICATION FILED APR. 10, 1914.
1,108,785.
Patented Aug. 25, 1914.
2 SHEETS—SHEET 2.
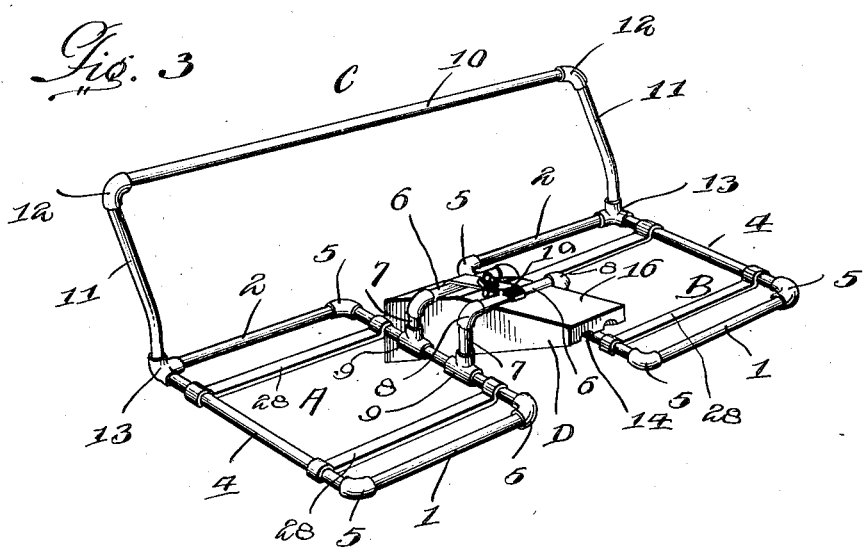
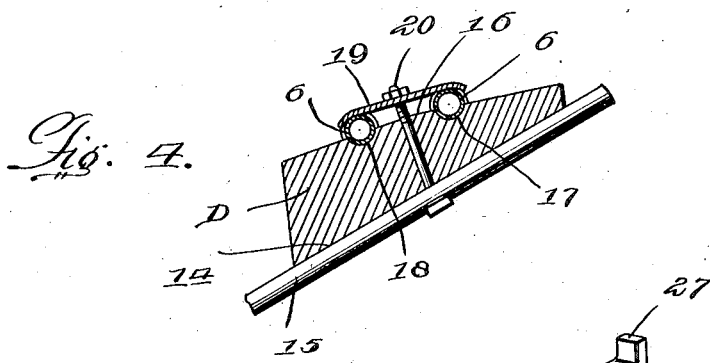
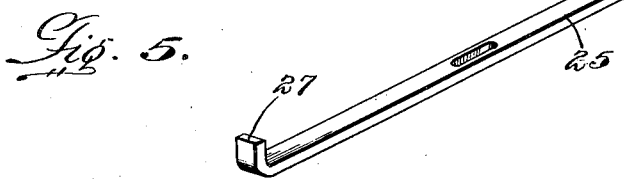
Inventor
George F. Plank.
Witnesses
Frederick L. Fae.
R. M. Smith.
By Victor J. Evans.
Attorney

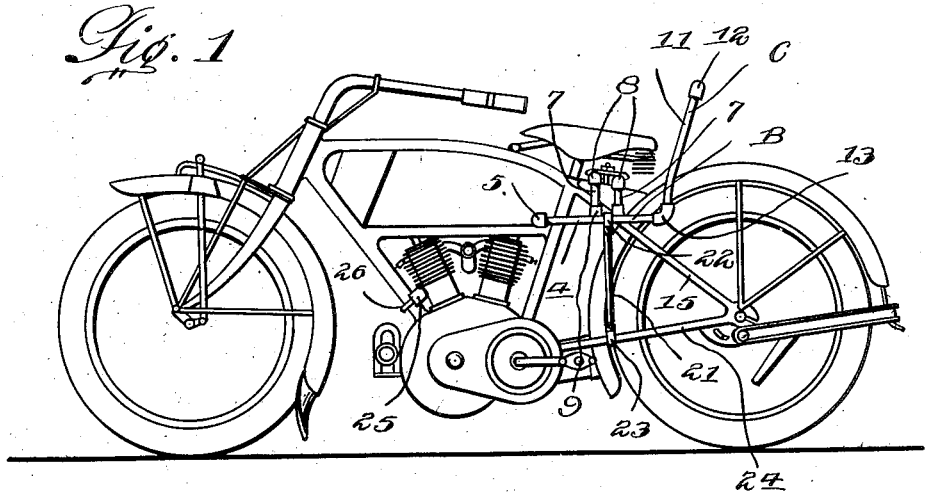
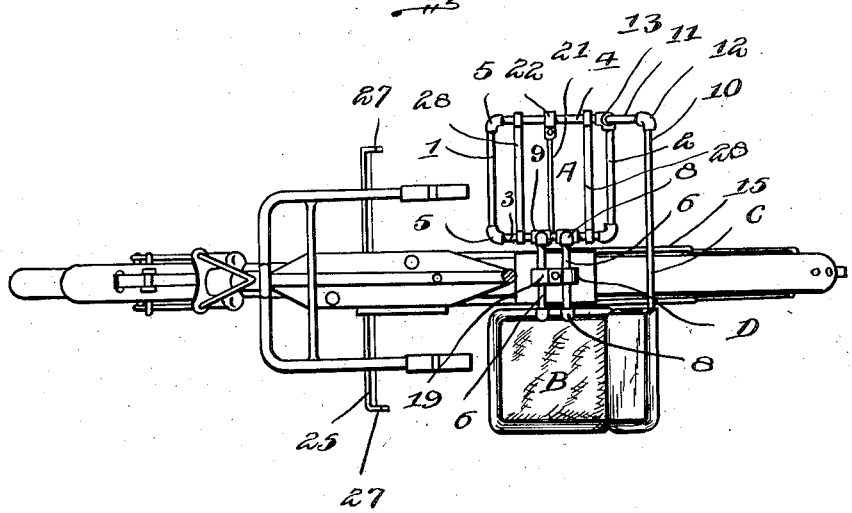

UNITED STATES PATENT OFFICE.

GEORGE F. PLANK, OF EUGENE, OREGON.

MOTOR-CYCLE PASSENGER-SEAT.

1,108,785.

Specification of Letters Patent. Patented Aug. 25, 1914.

Application filed April 10, 1914. Serial No. 831,038.

*To all whom it may concern:*

Be it known that I, GEORGE F. PLANK, a citizen of the United States, residing at Eugene, in the county of Lane and State of Oregon, have invented new and useful Improvements in Motor-Cycle Passenger-Seats, of which the following is a specification.

This invention relates to passenger seats for motor-cycles and similar vehicles, the object of the invention being to provide a simple, strong and economically manufactured passenger seat applicable quickly to any motorcycle and adapted to support two passengers in addition to the operator of the machine, the passengers being arranged at opposite sides of the center of the machine so as not to interfere with the operation and steering of the machine.

With the above and other objects in view, the invention consists in the novel combination, construction and arrangement of parts, as will be hereinafter more fully described, illustrated and claimed.

In the accompanying drawings: Figure 1 is a side elevation showing the passenger seat of this invention applied to a motor-cycle. Fig. 2 is a plan view of the same. Fig. 3 is a perspective view of the passenger seat complete with the exception of the upholstery. Fig. 4 is a detail section on an enlarged scale showing the means for fastening the seat to a motorcycle. Fig. 5 is a detail perspective view of the auxiliary or passenger foot rest.

The passenger seat of this invention is designed for carrying two passengers in addition to the operator of the machine, and for that purpose, the passenger seat comprises twin seat frames A and B each of which is substantially square in plan view and composed of front and rear bars 1 and 2 and inner and outer side bars 3 and 4, respectively, said bars consisting of suitable lengths of pipe connected at the corners by elbows 5 which enable said seat frames to be made out of ordinary stock material. The seat frames A and B are spaced a suitable distance apart but are rigidly connected together by means of the tie arches 6, two of such arches being shown and arranged in parallel relation to each other, each of said arches comprising the horizontal top bar to which the reference numeral 6 is applied, and the downwardly extending side bars 7 connected to the bars 6 by elbows 8 and connected to the bars 3 by T's 9.

In addition to the structure above set forth, the seat comprises a bail shaped back frame C comprising a top horizontal bar 10 and end bars or uprights 11 connected with the bar 10 by elbows 12 and rigidly connected at 13 to the rear outer corners of the seat frames A and B. All of the parts thus far described are composed entirely of pipes and pipe fittings, constituting the ordinary stock material which may be purchased at low cost from any manufacturer.

The passenger seat frame is connected in fixed relation to the frame of a motorcycle in the manner best illustrated in Fig. 4 wherein it will be observed that I employ a substantially wedge-shaped supporting block D having a grooved bottom face 14 adapted to rest upon the upper extremities of the rear braces 15 of the motorcycle frame, the upper inclined face 16 of the block being transversely grooved at 17 and 18 to form seats for the tie arches 6 above described, the said arches being fastened to the supporting block 14 by means of a clamping plate 19 secured in place by a bolt 20 extending upwardly from the supporting block 14 as clearly shown in Fig. 4. Downwardly converging braces 21 are connected at their upper extremities to the outside bars 4 of the seat frames by means of clips 22 and said braces are also provided at their lower convergent extremities with other clips 23 adapting them to be fastened in rigid relation to the bottom runs or fork members 24 of the motorcycle frame. The passenger seat frame as a whole may be readily removed from the motorcycle by disconnecting the clips 23 and loosening the clamping plate 19 which straddles the two tie arches 6. An auxiliary foot rest bar 25 is secured to the bottom member or reach of the motorcycle frame by means of a clip 26, the opposite extremities of said foot rest being upturned to form foot guards 27 as shown in Fig. 5. The seat cushions are supported by means of seat supporting cross bars 28 having curved end portions which are adapted to snap over the end bars of the seat frame, the cushions rest directly on the supporting bars 28 and within the main frame. The seat frame as a whole may be constructed of any suitable material. The operator may sit on either side of the machine, that is occupy either of the side seats, either with or without a passenger on the opposite side.

What I claim is:—

1. A two passenger seat for motorcycles, embodying twin seat frames, parallel tie arches rigidly connecting said seat frames, a wedge-shaped supporting block straddled by said arches, means for fastening said arches to said block, and braces extending from the outer portions of both seat frames convergently downward to connect with the motorcycle frame.

2. A two passenger seat for motorcycles, embodying twin seat frames, parallel tie arches rigidly connecting said seat frames, a wedge-shaped supporting block straddled by said arches, means for fastening said arches to said block, braces extending from the outer portions of both seat frames convergently downward to connect with the motorcycle frame, and a back frame embodying a bail-shaped bar terminally fastened to the outer rear corners of said seat frames.

3. A two passenger seat for motorcycles, embodying twin seat frames, parallel tie arches rigidly connecting said seat frames, a wedge-shaped supporting block straddled by said arches, means for fastening said arches to said block, braces extending from the outer portions of both seat frames convergently downward to connect with the motorcycle frame, and a back frame embodying a bail-shaped bar terminally fastened to the outer rear corners of said seat frames, the structure comprising the twin seat frames, tie arches and back frame being entirely made up of pipes and pipe fittings.

In testimony whereof I affix my signature in presence of two witnesses.

GEORGE F. PLANK.

Witnesses:
F. T. PLANK,
H. H. HUBBARD.